US009998788B1

(12) United States Patent
Hertzfeld et al.

(10) Patent No.: US 9,998,788 B1
(45) Date of Patent: Jun. 12, 2018

(54) METHODS AND SYSTEMS FOR CONTENT STORAGE

(71) Applicant: Comcast Cable Communications, LLC, Philadelphia, PA (US)

(72) Inventors: Bruce Hertzfeld, Narberth, PA (US); Mark McKelvey, Malvern, PA (US); Thomas Day, Superior, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days. days.

(21) Appl. No.: 14/789,100

(22) Filed: Jul. 1, 2015

(51) Int. Cl.
*H04N 21/458* (2011.01)
*H04N 21/4147* (2011.01)
*H04N 21/472* (2011.01)

(52) U.S. Cl.
CPC ..... *H04N 21/4583* (2013.01); *H04N 21/4147* (2013.01); *H04N 21/47214* (2013.01)

(58) Field of Classification Search
CPC ........... H04N 21/4583; H04N 21/4147; H04N 21/47214
USPC ................................ 386/239, 247, 278, 292
See application file for complete search history.

(56) References Cited

U.S. PATENT DOCUMENTS

| | | | |
|---|---|---|---|
| 7,607,157 B1 * | 10/2009 | Inoue | H04N 5/44 386/291 |
| 8,299,944 B2 | 10/2012 | Provenzano | |
| 8,364,652 B2 | 1/2013 | Vijayan et al. | |
| 8,484,162 B2 | 7/2013 | Prahlad et al. | |
| 2004/0042764 A1 * | 3/2004 | Takinami | G11B 27/034 386/283 |
| 2006/0222325 A1 * | 10/2006 | Ellis | G11B 27/034 386/270 |
| 2007/0016922 A1 * | 1/2007 | Koch | G06Q 30/02 725/35 |
| 2008/0010656 A1 * | 1/2008 | Cho | H04N 5/44543 725/40 |
| 2008/0059884 A1 * | 3/2008 | Ellis | H04N 5/44543 715/721 |
| 2008/0273856 A1 * | 11/2008 | Bumgardner | H04N 5/782 386/292 |
| 2008/0307485 A1 * | 12/2008 | Clement | H04N 5/76 725/152 |
| 2010/0211987 A1 | 8/2010 | Chou | |
| 2011/0026902 A1 * | 2/2011 | Nguyen | H04N 5/76 386/295 |
| 2013/0060739 A1 | 3/2013 | Kalach et al. | |

(Continued)

OTHER PUBLICATIONS

Katiyar, et al., ViDeDup: An Application-Aware Framework for Video De-duplication, Proceedings of the 3rd USENIX conference on Hot topics in storage and file systems (2011) (5 pages).

*Primary Examiner* — Mishawn Hunter
(74) *Attorney, Agent, or Firm* — Ballard Spahr LLP

(57) ABSTRACT

Provided are methods and systems for reducing content storage space and network resources. A device, such as a network storage device, can receive a plurality of requests to record a content item with varying start times and end times. The network device can map the start time and end time of each request to a subscriber, premises, and/or device. The network device can determine the earliest of the start times associated with the content item and the latest of the end times associated with the content item. In an aspect, the network device can make a recording, starting at the earliest start time and ending at the latest end time.

20 Claims, 9 Drawing Sheets

(56) References Cited

U.S. PATENT DOCUMENTS

| | | | |
|---|---|---|---|
| 2013/0247107 A1* | 9/2013 | Templeman | H04N 5/782 725/47 |
| 2013/0279886 A1* | 10/2013 | Benzaia | H04N 5/76 386/296 |
| 2014/0153907 A1* | 6/2014 | Farah | H04N 9/7921 386/297 |
| 2014/0376884 A1* | 12/2014 | Lovell | G11B 27/105 386/241 |
| 2015/0081706 A1* | 3/2015 | Elmqvist Wulcan | G06F 17/30321 707/737 |
| 2015/0350701 A1* | 12/2015 | Lemus | H04N 21/23116 725/92 |
| 2016/0014477 A1* | 1/2016 | Siders | H04N 21/2747 725/32 |
| 2016/0360243 A1* | 12/2016 | Arbuckle | H04N 21/23116 |

* cited by examiner

FIG. 3
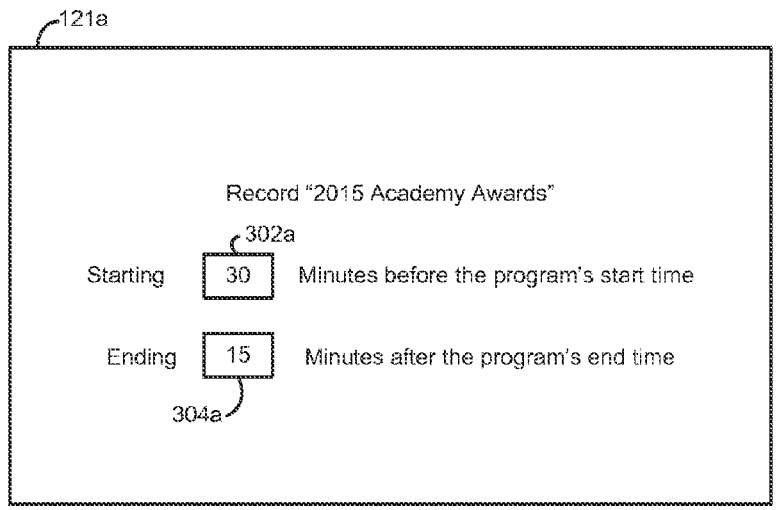
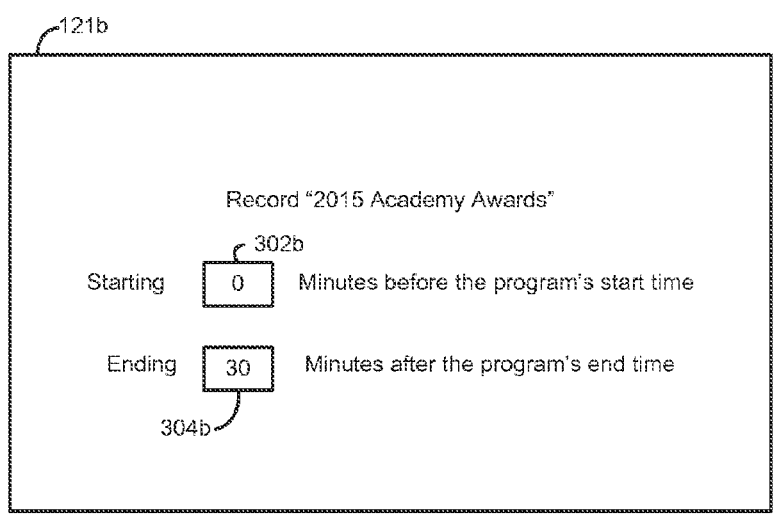
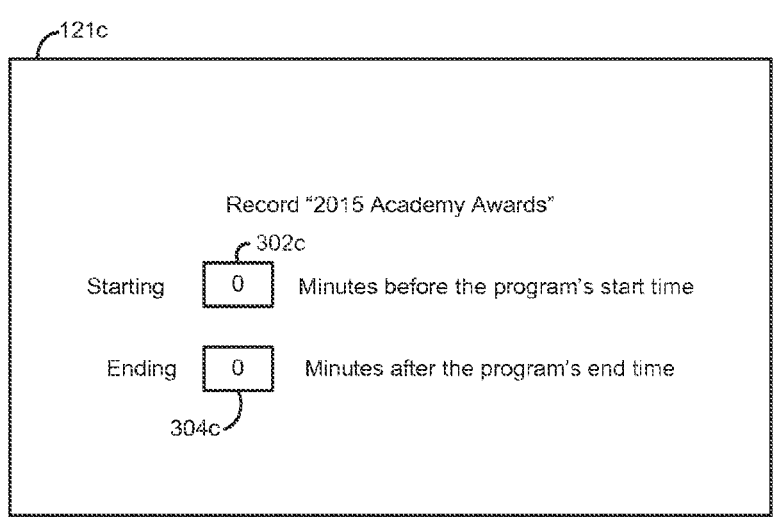

FIG. 4

| Program | Device | Start Offset | End Offset | Commercial |
|---|---|---|---|---|
| 2015 Academy Awards | 120a | 30 | 15 | Yes |
| 2015 Academy Awards | 120b | 0 | 30 | Yes |
| 2015 Academy Awards | 120c | 0 | 0 | Yes |

METHODS AND SYSTEMS FOR CONTENT STORAGE

BACKGROUND

With cloud storage gaining popularity, there is a need to conserve storage space. One technique for conserving storage space is through de-duplication of stored data files. Data files that consist of the same content are targets for de-duplication. However, identifying data files that consist of the same content is problematic. These and other shortcomings of the prior art are addressed by the present disclosure.

SUMMARY

It is to be understood that both the following general description and the following detailed description are exemplary and explanatory only and are not restrictive. Provided are methods and systems for reducing content storage space. A device, such as a local and/or remote computing device (e.g., local or cloud digital video recorder (DVR)), can receive a plurality of requests to record a content item with varying start times and end times. The local and/or remote computing device, or an associated computing device, can map the start time and end time of each request to a user (e.g., subscriber), client, premises, and/or device. The local and/or remote computing device can determine the earliest of the start times associated with the content item and the latest of the end times associated with the content item. In an aspect, the local and/or remote computing device can make one recording, starting at the earliest start time and ending at the latest end time. In an aspect, the local and/or remote computing device can force each request for the content item to use the earliest start time and the latest end time, causing each instance of the content item to be the same size.

In an aspect, when a user requests the content item, the local and/or remote computing device can use the mapped start time and end time that the user originally requested to generate (e.g., record, package, crop, etc.) a copy of the content item, before transmitting the cropped copy to the user. Alternatively, the DVR, or an associated computing device, can provide the full (not cropped) copy of the content item with embedded instructions (e.g., in metadata) to modify start/stop times based on the original request. In an aspect, when a user requests the content item, the local and/or remote computing device or associated devices (e.g., servers, packagers, encoders, etc.) can transmit the content item to the user, starting at the mapped start time and concluding at the mapped end time. In an aspect, when a user requests the content item, the local and/or remote computing device can transmit the content item to the user, wherein the portion of the content item before the mapped start time and/or after the mapped end time is inaccessible to the user.

In an aspect, provided are methods and systems whereby a plurality of requests to store content can be received. The plurality of requests can comprise a plurality of start times. The plurality of requests can comprise a plurality of end times. An earliest start time of the plurality of start times can be determined. A latest end time of the plurality of end times can be determined. For each of the plurality of requests, an instance of the content starting at the determined start time and ending at the determined end time can be stored.

In an aspect, provided are methods and systems whereby a first request to store content can be received at a network device. The first request can comprise a first start offset and a first end offset. The content can be stored on the network device in a first content file. The first content file can represent a portion of the content presented between and including the first start offset and the first end offset. A second request to store the content can be received on the network device. The second request can comprise a second start offset and a second end offset. The second start offset can be less than the first start offset. The second end offset can be less than the first end offset. A determination can be made that the content has already been stored in the first content file. A determination can be made that the first content file is associated with the first start offset and the first end offset. A determination can be made that the second start offset is less than the first start offset and that the second end time is less than the first end offset. The content can be stored on the network device in a second content file. The second content file can represent the portion of the content presented between and including the first start offset and the first end offset.

In an aspect, provided are methods and systems whereby a request for stored content can be received from a user. A start time and an end time can be determined to be associated with the user and the stored content. A copy of the stored content can be generated based on the determined start time and the determined end time. The generated copy of the stored content can be provided to the user.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 illustrates a plurality of user interfaces used in an exemplary system;
FIG. 4 is a database table used in an exemplary system.

DETAILED DESCRIPTION

Figure 1:
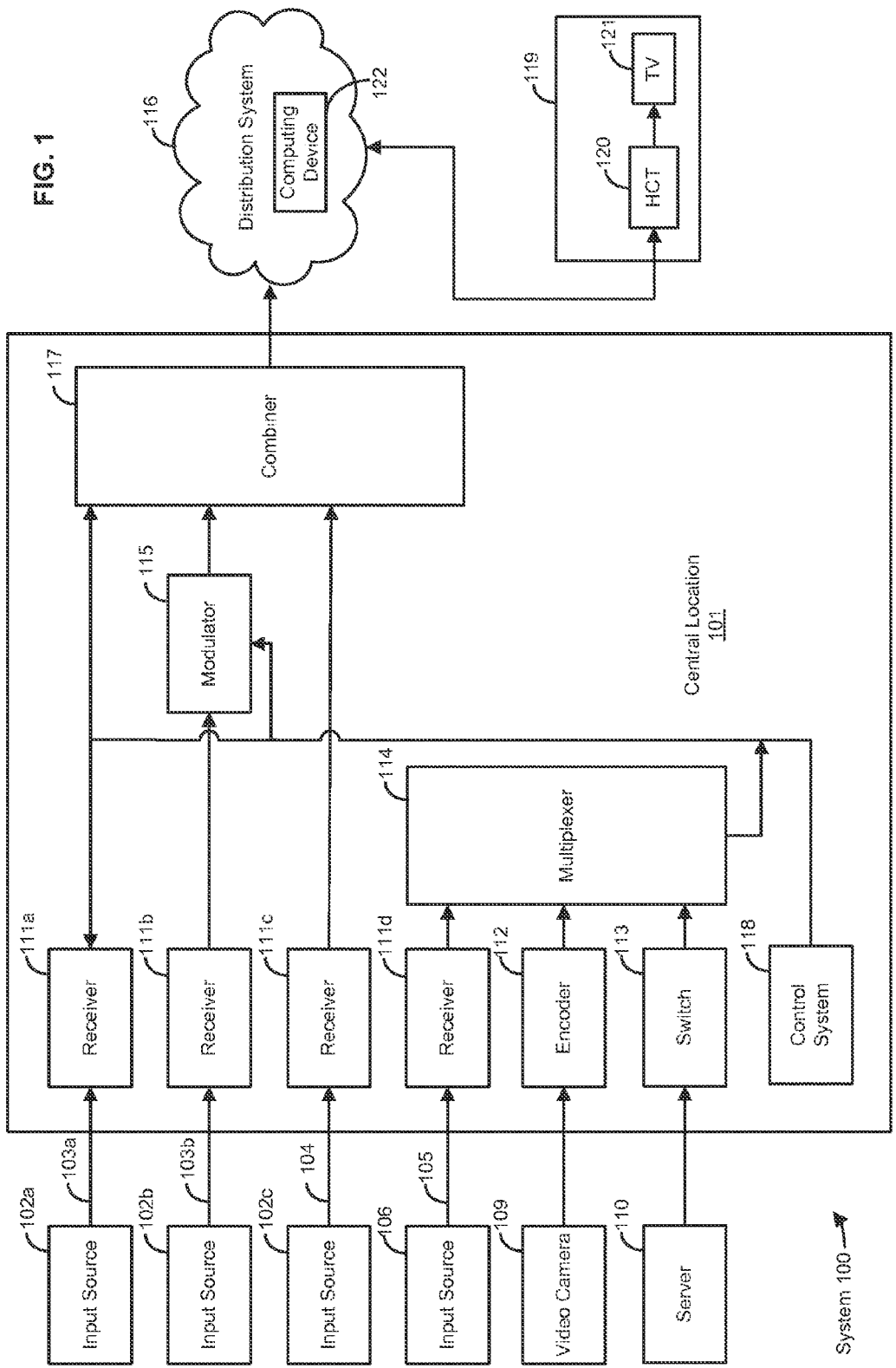
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for reducing the amount of content stored in a device (e.g., network device), such as a cloud digital video recorder (DVR). In an aspect, the network device can receive requests from several different users to store, record, or capture the same content. The methods and systems can determine which of the requests has the earliest start time and which of the requests has the latest end time. In an aspect, the methods and systems can force each stored, recorded, or captured copy of the same content to have the same start time as the earliest determined start time. In a further aspect, the methods and systems can force each stored, recorded, or captured copy of the content to have the same end time as the latest determined end time. In an aspect, forcing each copy of the same content to comprise the same start time and end time, forces the content to be "identical" and/or the underlying data structure (e.g., file) to be "identical." The use of the term "identical" simply means that content items comprising the same content are considered a "match" for de-duplication purposes. Therefore, recorded copies can be easily reduced to one copy during de-duplication. Copies of content are not required to be bit-for-bit identical.

The identical copies of the content can be stored in short-term storage. At a later point in time, a de-duplication operation can performed on the short-term storage. Because the described methods and systems can make the same content identical for de-duplication purposes, files comprising the same content can be de-duplicated. One copy of the content can be stored in archival storage, and the identical copies in short-term storage can be deleted.

In an aspect, when a user requests playback of the particular content, the start time and end time associated with the corresponding profile, user, and/or device can be retrieved. In an aspect, the content can be transmitted to a user device, starting at the retrieved start time and ending at the retrieved end time. In an aspect, a copy of the content can be cropped, wherein the remaining portion of the cropped copy of the content can be the portion starting at the retrieved start time and the ending at the retrieved end time. In a further aspect, the cropped content can be transmitted to a user device. In an aspect, a copy of the content can be transmitted to the user device, wherein the portion of the copy of the content between the determined start time and the retrieved start time can be inaccessible to the device and/or wherein the portion of the copy of the content between the retrieved end time and the determined end time can be inaccessible to the device.

FIG. 1 illustrates various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., video, audio, images, text, application files, data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, such as wireless paths (e.g. satellite paths 103a, 103b) and terrestrial path 104. The central location 101 can also receive content from an input source 106 via a direct line 105. Other input sources can comprise capture devices, such as a video camera 109, a server 110, and/or the like. The content provided by the content sources can comprise a single content item, a portion of a content item (e.g., content fragment), a content stream, a multiplex that includes several content items, and/or the like.

The central location 101 can comprise one or a plurality of receivers 111a, 111b, 111c, 111d that are associated with one or more corresponding input sources. The central location 101 can comprise one or more encoders 112, switches 113, multiplexers, and/or the like. For example, an encoder 112 can compress, encrypt, transform, and/or otherwise encode content. As a further example, the encoder 112 can encode content based on one or more compression standards, such as MPEG. As another example, the encoder can receive content from the video camera 109 and/or other source and apply one or more encoding algorithms to the received content. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer 114.

The central location 101 can comprise one or more modulators 115 for interfacing with a distribution system 116. As an example, a modulator can receive content from a receiver 111, encoder 112, multiplexer 114, and/or the like. A modulator 115 can convert the received content into a modulated output signal suitable for transmission over the distribution system 116. For example, a modulator 115 can map portions of the content to data bits expressed as signals (e.g., sinusoidal signals) at corresponding subcarrier frequencies of a data symbol. The output signals from the modulators 115 can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for a television system, billing for each user, conditional access for content distributed to users, and the like. The control system 118 can provide input to the modulators for setting operating parameters, such as system specific MPEG table packet organization or conditional access information. The control system 118 can be located at central location 101 or at a remote location.

The distribution system 116 can distribute content from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120. TV's 121, central locations 101, DVR's, home theater PC's, and the like. The distribution system can use any method of transmitting a signal to distribute content. A method of transmitting a signal can comprise any messaging protocol, including internet protocol (IP). A method of transmitting a signal can comprise any messaging standard, including data over cable service interface specification (DOCSIS).

In an aspect, user location 119 is necessarily not fixed. By way of example, a user can receive content from the distribution system 116 on a mobile device such as a laptop computer, PDA, smartphone, GPS, vehicle entertainment system, portable media player, and the like.

In an exemplary embodiment, the methods and systems disclosed can be located within one or more local and/or remote computing devices 122, such as a cloud DVR, in the distribution system 116. In an aspect, one or more HCT's 120 can transmit a plurality of requests to store a content item in one or more local and/or remote computing devices 122. The one or more local and/or remote computing devices 122 can force each recording corresponding to the plurality of requests to be the same size-comprising the earliest requested start time and the latest requested end time. In an aspect, at a later time, an archival system can reduce the copies of the content item to one copy during a de-duplication operation. In an aspect, one or more HCT's 120 can transmit a plurality of requests to playback stored content from one or more local and/or remote computing devices 122. The one or more local and/or remote computing devices 122 can store a mapping of the one or more HCT's 120 with the content requested for each of the one or more HCT's 120. The stored mappings in the one or more local and/or remote computing devices 122 can comprise a requested start time and a requested end time. In an aspect, one of the one or more HCT's 120 can request playback of the content item. In a further aspect, the one or more local and/or remote computing devices 122 can transmit the content item, starting at the start time mapped to the HCT requesting playback and terminating at the end time mapped to the HCT requesting playback.

Figure 2:
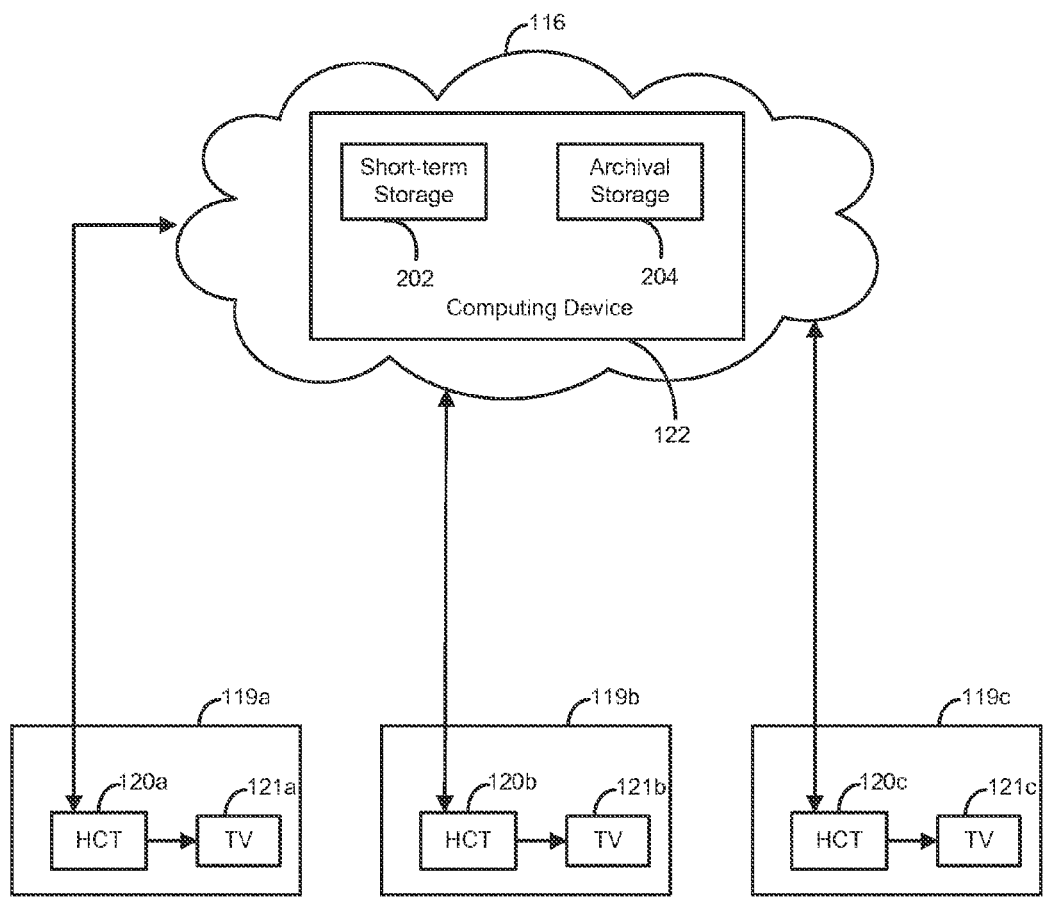
FIG. 2 is a block diagram of an exemplary system.

Turning now to FIG. 2, a block diagram of an exemplary system is illustrated. In an aspect, one or more HCT's 120a, 120b, 120c in communication with one or more TV's 121a, 121b, 121c at one or more premises 119a, 119b, 119c can communicate with one or more network devices, such as one or more local and/or remote computing devices 122 in a distribution system 116. The one or more local and/or remote computing devices 122 can comprise short-term storage 202 and archival storage 204. Optionally, the short-term storage 202 and the archival storage 204 can be removable and/or remote from the one or more local and/or remote computing devices 122. In an aspect, a local and/or remote computing device 122 can receive requests from several different HCT's 120a, 120b, 120c to store, record, or capture the same content. Each of the requests can comprise a start time and an end time. In an aspect, a request can have the same start time as the start time listed in an electronic programming guide (EPG) for the primary content. In an aspect, a request can have a start time that is some offset of the start time listed in an electronic programming guide (EPG) for the primary content. As an example, an offset can be 5 minutes, and the request can have a start time of five minutes prior to the start time listed in an electronic programming guide (EPG) for the primary content. In a further aspect, an offset can be selected from a list of predetermined offset choices. In a further aspect, an offset can be manually entered.

In an aspect, a request can have a start time based on a program prior to the content. As an example, if the primary content is a football game, a start time can be based on the start time of a pregame show that comes on prior to the football game. In an aspect, a request can have the same end time as the end time listed in an electronic programming guide (EPG) for the primary content. In an aspect, a request can have an end time that is some offset of the end time listed in an electronic programming guide (EPG) for the primary content. As an example, an offset can be 5 minutes, and the request can have an end time of five minutes after the end time listed in an electronic programming guide (EPG) for the primary content. In a further aspect, an offset can be selected from a list of predetermined offset choices. In a further aspect, an offset can be manually entered. In an aspect, a request can have an end time based on a program following the primary content. As an example, if the primary content is a football game, an end time can be based on the end time of a postgame show that follows the football game. In an aspect, a request for a content item with a variable start time and/or end time, such as a live event and/or a content item that follows a live event, can be when a subject of the content item begins and/or ends. For example, a user requesting to record a second tournament basketball game that follows a first basketball game can include a request that starts at the beginning of the second tournament basketball game and ends when the second tournament basketball game ends. Occurrences during a live event, such as overtime, can have variable end time. The end time of the first tournament basketball game can affect the start time of the second tournament basketball game. In an aspect, the start time and/or end time of the content item can be determined by a third party monitor of the content item. In a further aspect, the third party monitor of the content item can determine the actual start and/or end time of such a request by observing the content item and memorializing when in the content item the subject begins and/or ends. In an aspect, the start time and/or end time of the content item can be determined by examining closed caption data. In an aspect, the start time and/or end time of the content item can be determined by examining metadata. In an aspect, the start time and/or end time of the content item can be determined by examining information, such as an electronic programming guide (EPG).

In an aspect, each request to store the particular content can be mapped to a profile, user, location 119a, 119b, 119c, and/or device 120a, 120b, 120c, start time, and end time. In an aspect, the earliest start time of the requests for particular content can be determined. In an aspect, the latest end time of the requests for particular content can be determined. In an aspect, a copy of the particular content can be stored in short-term storage 202 of the local and/or remote computing device 122 for each request, wherein each stored copy of the content can comprise the determined start time and the determined end time. In a further aspect, one of the copies of the content can be preserved in archival storage 204. In a further aspect, all of the copies of the content stored in short-term storage 202 can be removed, leaving only the lone copy of content in archival storage 204. In an aspect, one copy can be stored for all of the requests to store the particular content in either short-term storage 202 or archival storage 204. In an aspect, the one copy in either short-term storage 202 or archival storage 204 can comprise the determined start time and the determined end time.

In an aspect, one or more user devices, such as HCT's 120a, 120b, 120c, can request playback of the particular content. In an aspect, when one or more of the HCT's 120a, 120b, 120c request playback of the particular content, the start time and end time associated with the corresponding profile, user, location 119a, 119b, 119c, and/or device 120a, 120b, 120c can be retrieved. In an aspect, the content can be transmitted to a user device 120a, 120b, 120c, starting at the retrieved start time and ending at the retrieved end time. In an aspect, a copy of the content can be cropped, wherein the remaining portion of the cropped copy of the content can be the portion starting at the retrieved start time and the ending at the retrieved end time. In a further aspect, the cropped content can be transmitted to a user device 120a, 120b, 120c. In an aspect, a copy of the content can be transmitted to the user device 120a, 120b, 120c, wherein the portion of the copy of the content between the determined start time and the retrieved start time can be inaccessible to the user device 120a, 120b, 120c and/or wherein the portion of the copy of the content between the retrieved end time and the determined end time can be inaccessible to the device 120a, 120b, 120c.

In an aspect, a request to store content can comprise an attribute. Any attribute in which a selection of the attribute creates instances of the content that are subsets of instances of the content associated with non-selection or other selections of the attribute can use the methods and systems described herein. For example, a first user could request to store content, but specify that commercials not be stored. In the example, a second user could request to store content, but specify that commercials should be stored. In an aspect, each copy of the stored content can comprise commercials. In an aspect, the attribute can be mapped to the users. In the example, for the attribute "Commercials?," the first user is mapped to "No" and the second user is mapped to "Yes." In an aspect, when the first user requests playback of the content item, the portion of the content item containing commercials can be skipped. In an aspect, the commercials can be skipped using jump points, cropping the commercials out, and/or any other method of skipping content.

In an aspect, subsets of stored content can be grouped for de-duplication. For example, a list of predetermined offset choices can comprise: one minute before primary content, two minutes before primary content, one minute after primary content, and two minutes after primary content. In the example, no matter what offset is included in the request (no offset, one minute offset, and/or two minutes offset before and/or after primary content), the primary content will be recorded. Therefore, the recordings of the primary content corresponding to each request can be made as separate content items from any offset recordings. In an aspect, the recordings corresponding to requests for one minute before the primary content can each record the minute before the start of the primary content as a separate content item, the recordings corresponding to requests for two minutes before the primary content can each record the two minutes before the start of the primary content as a separate content item, and so on. In a further aspect, when a de-duplication of the requests is run, there will be five unique content items: 1) the primary content; 2) two minutes prior to the primary content beginning; 3) one minute prior to the primary content beginning; 4) one minute after the primary content ending; and 5) two minutes after the primary content ending. In an aspect, when a user requests playback of the content, a playlist of all the recorded options can be presented to the user. For example, even if the user only requested to record the primary content, if another user requested to record two minutes before and/or two minutes after the primary content, then the user can be presented with the option to include available offsets with the primary content. In another aspect, the methods and systems described herein can record the offsets in intervals. Using the list of predetermined offset choices from the example above, an example of an interval could be one minute. In an aspect, the recordings could comprise one or more of the following content items: 1) primary content; 2) the minute comprising: two minutes prior to the primary content beginning to one minute prior to the primary content beginning; 3) the minute prior to the primary content beginning; 4) the minute after the primary content ending; and 5) the minute comprising: one minute after the primary content ending to two minutes after the primary content ending. In a further aspect, when a de-duplication operation is performed, there will be five unique content items: 1) primary content; 2) the minute comprising: two minutes prior to the primary content beginning to one minute prior to the primary content beginning; 3) the minute prior to the primary content beginning; 4) the minute after the primary content ending; and 5) the minute comprising: one minute after the primary content ending to two minutes after the primary content ending. In an aspect, when a user requests playback of the content, a playlist of all the recorded options can be presented to the user. For example, even if the user only requested to record the primary content, if another user requested to record two minutes before and/or two minutes after the primary content, then the user can be presented with the option to include any interval offsets available with the primary content. In another aspect, the primary content and the offset can be recorded in intervals. Using the list of predetermined offset choices from the examples above, an example of an interval could be one minute. In the example, if a request to record causes a recording to begin after the primary content has started, for instance, 5 minutes and 30 seconds after the primary content has begun, then the initial content item will be 30 seconds, and the remaining content items of the primary content will be one minute intervals (with the possible exception of the last content item, which may not end on a minute interval). In a further aspect, when de-duplication of the primary content is performed, a content item for each minute interval of the primary content will be left, as well as a 30 second content item for the time between five and a half minutes and six minutes into the primary content. In an aspect, when a user requests playback of the content, a playlist of all the recorded options can be presented to the user. For example, even though the request to record started five and a half minutes into the primary content, a user can have the option of starting the playback at the beginning of the primary content or even to have the playback include any offset interval available.

Turning now to FIG. 3, exemplary user interfaces displayed on three TV's 121a, 121b, 121c in communication with three HCT's 120a, 120b, 120c at three premises 119a, 119b, 119c are illustrated. In an aspect, the exemplary user interfaces comprise a field for a start time offset 302a, 302b, 302c and a field for an end time offset 304a, 304b, 304c. Even though the fields displayed 302a, 302b, 302c, 304a, 304b, 304c take in a number representing minutes, any other time measurement may be used. See the description for FIG. 2 above for further examples of capturing a start time and an end time associated with a request to store content.

In the example shown in FIG. 3, HCT 120a (corresponding to user interface shown on TV 121a), HCT 120b (corresponding to user interface shown on TV 121b), and HCT 120c (corresponding to user interface shown on TV 121c) are requesting storage of the same content, the 2015 Academy Awards. In the example, HCT 120a requests a 30 minute start time offset (see field 302a) and a 15 minute end time offset (see field 304a). In the example, HCT 120b requests a 0 minute start time offset (see field 302b) and a 30 minute end time offset (see field 304b). In the example, HCT 120c requests a 0 minute start time offset (see field 302c) and a 0 minute end time offset (see field 304c). In an aspect, each of HCT 120a, 120b, and 120c can transmit their corresponding requests for storage to one or more network devices, such as local and/or remote computing devices 122.

In the example, the one or more local and/or remote computing devices 122 can determine that 30 minutes is the earliest of the start times of the requests to record the 2015 Academy Awards. In the example, the one or more local and/or remote computing devices 122 can determine that 30 minutes is the latest of the end times of the requests to record the 2015 Academy Awards. In an aspect, the one or more local and/or remote computing devices 122 can force the content stored in short-term storage 202 for HCT's 120a, 120b, and 120c to all have a start time that is 30 minutes before the start time of the 2015 Academy Awards and an end time that is 30 minutes after the 2015 Academy Awards. In a further aspect, during an archival period, the one or more local and/or remote computing devices 122 can store one copy of the content in archival storage 204 and remove all of the copies from short-term storage 202. In an aspect, the one or more local and/or remote computing devices 122 can make only one recording of the Academy Awards for all three requests from HCT's 120a, 120b, and 120c, wherein the only one recording has a start time that is 30 minutes before the start time of the 2015 Academy Awards and an end time that is 30 minutes after the 2015 Academy Awards.

Turning now to FIG. 4, an exemplary database for mapping storage requests, start time, and end times is illustrated. Column 402 comprises the content (or an identifier for the content) for which storage is requested. Column 404 comprises an identifier of the device requesting storage. Together, columns 402 and 404 can comprise a key for the exemplary database. However, in other aspects, a request can be keyed to a location, a user, an account, a profile, any other item for identification, or any combination of the foregoing. Column 406 comprises the start time offset for a request. Column 408 comprises the end time offset for the request. However, in other aspects, the start and end times could be captured by times, programs, and/or any other method of indicating a start time and an end time. Column 410 comprises an indication of if commercials should be recorded or not.

In the example shown in FIG. 4, the database can map a request for storage of the 2015 Academy Awards by HCT 120a to a start time offset of 30 minutes and an end time offset of 15 minutes. In the example, the database can map a request for storage of the 2015 Academy Awards by HCT 120b to a start time offset of 0 minutes and an end time offset of 30 minutes. In the example, the database can map a request for storage of the 2015 Academy Awards by HCT 120c to a start time offset of 0 minutes and an end time offset of 0 minutes.

Figure 5:
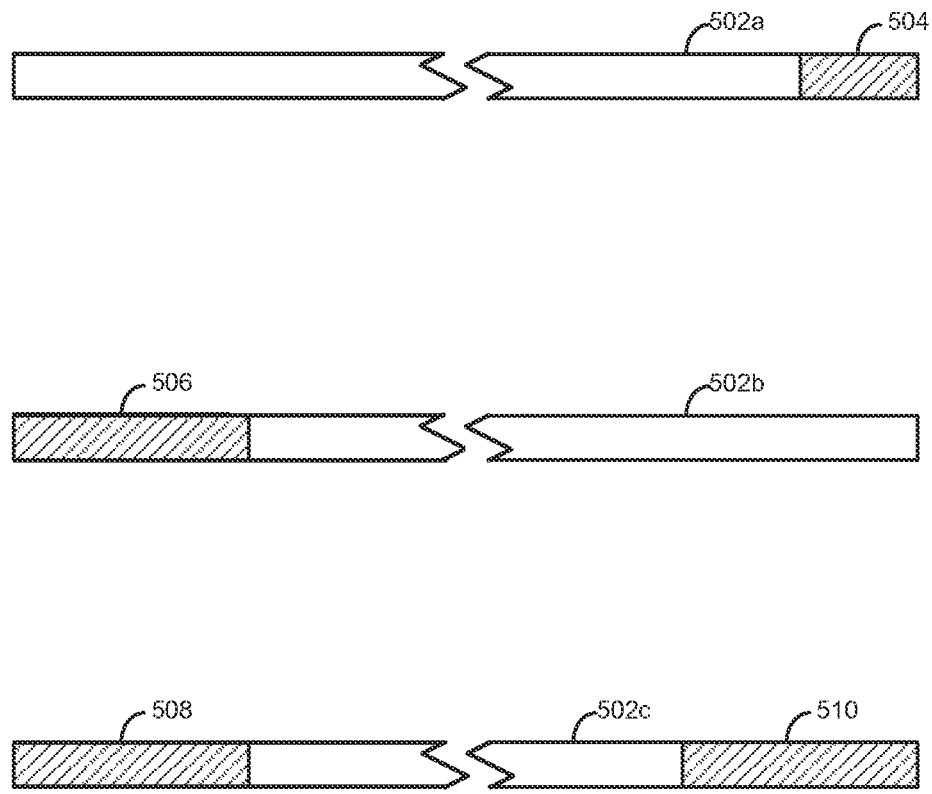
FIG. 5 illustrates a plurality of representations of content in accordance with an exemplary system.

Turning now to FIG. 5, an exemplary representation of content during playback is illustrated. In an aspect, a start time and an end time corresponding to the device (or profile, location, user, etc.) requesting playback of the content can be retrieved. In an aspect, the requested content can be transmitted from one or more local and/or remote computing devices 122 to one or more HCT's 120a, 120b, 120c. In an aspect, the one or more local and/or remote computing devices 122 can begin transmitting the content at the retrieved start time. In a further aspect, the one or more local and/or remote computing devices 122 can stop transmitting the content at the retrieved end time. In an aspect, the one or more local and/or remote computing devices 122 can create a cropped copy of the content, leaving only the portion between the retrieved start time and the retrieved end time in the cropped copy. In a further aspect, the one or more local and/or remote computing devices 122 can transmit the cropped copy of the content to the corresponding HCT 120a, 120b, 120c. In an aspect, the one or more local and/or remote computing devices 122 can create a copy of the content, wherein a portion between the beginning of the content and the retrieved start time is made inaccessible to the corresponding HCT 120a, 120b, 120c. In an aspect, the one or more local and/or remote computing devices 122 can create a copy of the content, wherein a portion between the retrieved end time and the end of the content is made inaccessible to the corresponding HCT 120a, 120b, 120c. In a further aspect, the one or more local and/or remote computing devices 122 can transmit the created copy of the content to the corresponding HCT 120a, 120b, 120c.

In the example shown in FIG. 5, content item 502a can represent the 2015 Academy Awards when HCT 120a requests playback from the one or more local and/or remote computing devices 122 and/or from archival storage. Area 504 represents the time between 15 minutes after the scheduled end time of the 2015 Academy Awards and 30 minutes after the scheduled end time of the 2015 Academy Awards. When HCT 120a plays the 2015 Academy Awards, it will not play the content represented by area 504. In the example, content item 502b can represent the 2015 Academy Awards when HCT 120b requests playback from the one or more local and/or remote computing devices 122 and/or from archival storage. Area 506 represents the time between 30 minutes before the scheduled start time of the 2015 Academy Awards and the scheduled start time of the 2015 Academy Awards. When HCT 120b plays the 2015 Academy Awards, it will not play the content represented by area 506. In the example, content item 502c can represent the 2015 Academy Awards when HCT 120c requests playback from the one or more local and/or remote computing devices 122 and/or from archival storage. Area 508 represents the time between 30 minutes before the scheduled start time of the 2015 Academy Awards and the scheduled start time of the 2015 Academy Awards. Area 510 represents the time between the scheduled end time of the 2015 Academy Awards and 30 minutes after the scheduled end time of the 2015 Academy Awards. When HCT 120c plays the 2015 Academy Awards, it will not play the content represented by area 508 or area 510.

Figure 6:
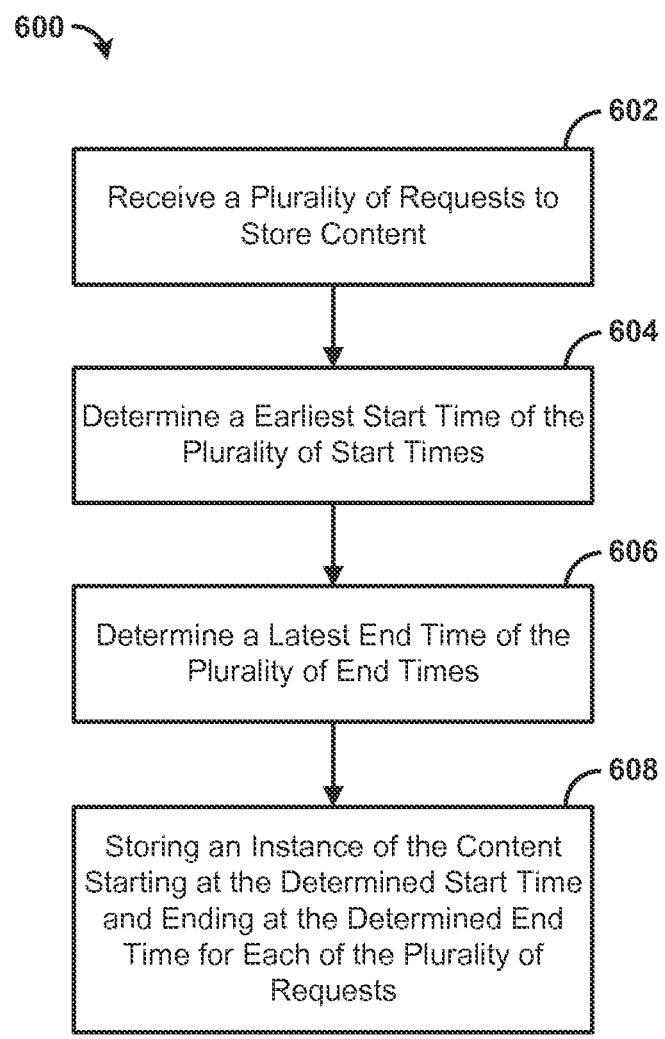
FIG. 6 is a flow chart of an exemplary method.

FIG. 6 is a flowchart illustrating an example method 600. At step 602, a plurality of requests to store content can be received. In an aspect, one or more network devices, such as local and/or remote computing devices 122, can receive a plurality of requests to store content from one or more user devices, such as HCT's 120a, 120b, 120c. In an aspect, the plurality of requests can comprise a plurality of start times. In an aspect, the plurality of requests can comprise a plurality of end times. In an aspect, each of the plurality of start times can be one of a plurality of options that a user selects from a list. In a further aspect, each of the options can be an offset of time before the content is scheduled to start. In an aspect, each of the plurality of end times can be one of a plurality of options that a user selects from a list. In a further aspect, each of the options can be an offset of time after the content is scheduled to end. In an aspect, the content can be a live program, such as a concert or sporting event. In an aspect, the content can be any video, such as a movie, show, or the like. In an aspect, the plurality of requests to store content can be a plurality of requests to store content at one or more intervals, such as daily and/or weekly. See the description for FIG. 2 above for more details on receiving a plurality of requests to store content.

At step 604, an earliest start time of the plurality of start times can be determined. The determination can be made by one or more local and/or remote computing devices 122. The determination can be made by comparing the start times of the received requests to store content. In an aspect, the determination can take into account time zone information of the user device originating each request when determining an earliest start time of the plurality of start times. At step 606, a latest end time of the plurality of end times can be determined. The determination can be made by one or more local and/or remote computing devices 122. The determination can be made by comparing the end times of the received requests to store content. In an aspect, the determination can take into account time zone information of the user device originating each request when determining a latest end time of the plurality of end times.

At step 608, an instance of the content starting at the determined start time and ending at the determined end time can be stored for each of the plurality of requests. In an aspect, each of the instances of the content can be identical. In an aspect, "identical" content can be matching content for the purposes of de-duplication, but does not necessarily have to be identical in all aspects. For example, metadata of "identical" content can be different. In another aspect, the file sizes of "identical" content can be different. In a further aspect, identical content can be reduced to one instance during de-duplication. In one aspect, two content items can be considered "identical" if one of the two content items is the same, bit-for-bit, as the other content items. In another aspect, two content items can be considered "identical" if one of the two content items has the same particular markers (e.g., title, season/episode combination, etc.) as the other content item. A particular marker for indicating if two content items are "identical" can be, for example, a combination of a show title, season, and/or episode. See the description for FIG. 2 above for more details on forcing stored content to have homogenous start and end times.

Optionally, a play request corresponding to one of the plurality of requests to store content can be received. In an aspect, the play request can be received at the one or more network devices, such as cloud DVR's 122, and/or from the one or more user devices, such as HCT's 120a, 120b, 120c. In an aspect, the play request can comprise a start time later than the determined earliest start time. In an aspect, the play request can comprise an end time earlier than the determined latest end time. Optionally, the content can be provided. The content can be provided from the one or more network devices, such as cloud DVR's 122 to the one or more user devices 120a, 120b, 120c. In an aspect, the portion of the content earlier than the requested start time may not be accessible. In an aspect, the portion of the content later than the requested end time may not be accessible. See the description for FIG. 2 above for more details on preparing and delivering content for play requests.

Optionally, each instance of the stored content can be cropped. In an aspect, each instance can represent an instance of a program. In an aspect, each cropped instance can begin at the start of the program. In an aspect, each cropped instance can end at the end of the program. For example, some programs, such as live events, do not have a start and end time that can be predicted. Therefore, after a live event, a network device, such as a cloud DVR 122, can crop the content so that what is stored starts at the beginning of the program and ends at the termination of the program.

Figure 7:
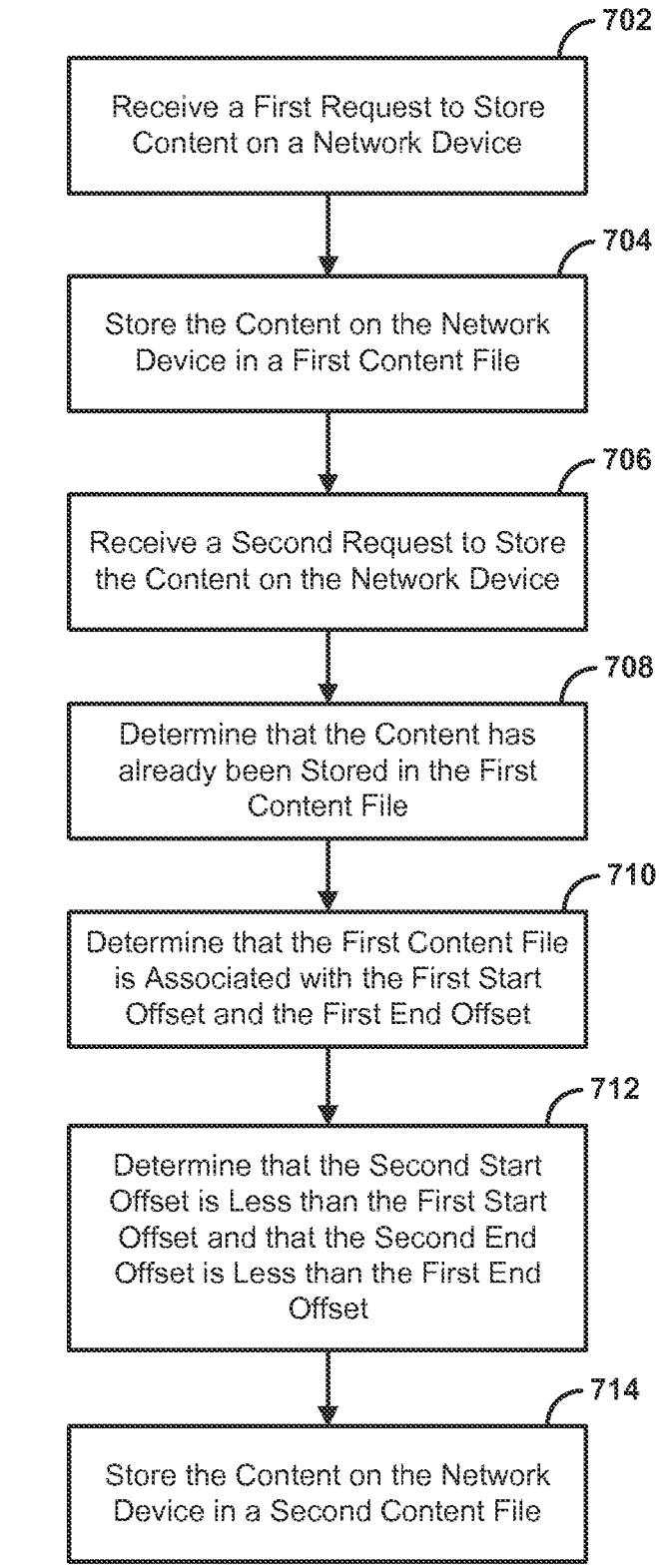
FIG. 7 is a flow chart of an exemplary method.

FIG. 7 is a flowchart illustrating an example method 700. At step 702, a first request to store content on a network device can be received. In an aspect, the network device can be a cloud digital video recorder. The first request can comprise a first start offset and a first end offset. In an aspect, the content can be a live program, such as a concert or sporting event. In an aspect, the content can be any video, such as a movie, show, or the like. At step 704, the content can be stored on the network device in a first content file. In an aspect, the first content file can represent a portion of the content presented between and including the first start offset and the first end offset. At step 706, the network device can receive a second request to store the content. The second request can comprise a second start offset and a second end offset. In an aspect, the second start offset can be less than the first start offset. In an aspect, the second end offset can be less than the first end offset. For example, the first start offset can be 10 minutes, while the second start offset can be 5 minutes and the second end offset can be 5 minutes, while the second end offset can be 1 minute. At step 708, a determination can be made that the content has already been stored in the first content file (e.g., same movie, same television episode, and the like). In an aspect, the determination that the content has already been stored in the first content file can be made by comparing a first identifier in the first content file with a second identifier in the second request. In a further aspect, the first and/or second identifiers can be sufficient to identify unique instances of content. For example, an identifier can comprise a show's title (including a country identification, if appropriate), season number, and/or episode number. At step 710, a determination can be made that the first content file is associated with the first start offset and the first end offset. At step 712, a determination can be made that the second start offset is less than the first start offset and that the second end offset is less than the first end offset, relative to the content.

At step 714, the content can be stored on the network device in a second content file. In an aspect, the first content file and the second content file can be forced to be the same size, so that a subsequent de-duplication process can efficiently identify and de-duplicate the first content file and second content file based on both files being the same size. The result of the de-duplication process can be one file. The start offset chosen for the first content file and the second content file can be the greater of the two start offsets so that each file comprises at least the offset requested. The end offset chosen for the first content file and the second content file can be the greater of the two end offsets so that each file comprises at least the offset requested. In an aspect, the second content file can represent the portion of the content presented between and including the first start offset and the first end offset. In an aspect, a start offset of each content file associated with each subsequent request to store the content can be the first start offset, as long as a start offset associated with each subsequent request less than or equal to the first start offset. In an aspect, an end offset of each content file associated with each subsequent request to store the content can be the first end offset, as long as an end offset associated with each subsequent request is less than or equal to the first end offset. In an aspect, a start offset of each content file associated with each request to store the content can be updated to a third start offset in response to receiving a request to store the content, wherein the request comprises the third start offset and the third start offset is greater than the first start offset. In an aspect, an end offset of each content file associated with each request to store the content can be updated to a third end offset in response to receiving a request to store the content, wherein the request comprises the third end offset and the third end offset is greater than the first end offset. See the description for FIG. 2 above for more details on receiving a plurality of requests to store the same content to a network device.

Optionally, a request to play the second stored content can be received. In an aspect, the second stored content can be transmitted. In a further aspect, the portion of the second stored content between and including the first start offset and the second start offset can be inaccessible. In a further aspect, the portion of the second stored content between the second end offset and the first end offset can be inaccessible. See the description for FIG. 2 above for more details on transmitting a request to play stored content.

Optionally, in an aspect, the second content file can be deleted. Optionally, in an aspect, the first content file can be moved to an archival storage. Optionally, the content can be stored on the network device only one time for the first request and the second request. In an aspect, the content can be stored in one instance on the network device for the first request, and the content can be stored in a second instance on the network device for the second request. In a further aspect, one of the two instances of the content can be deleted. In a further aspect, a third instance of the content can be archived and the two stored instances can be deleted. See the description for FIG. 2 above for more details on storing content on the network device.

Optionally, a plurality of start offset options can be provided. In an aspect, a selection of one of the plurality of start offset options can be received. In an aspect, the first start offset can be set to the selected start time. See the description for FIG. 2 above for more details on selecting a start time.

Optionally, a plurality of end offset options can be provided. In an aspect, a selection of one of the plurality of end offset options can be received. In an aspect, the first end offset can be set to the selected end time. See the description for FIG. 2 above for more details on selecting an end time.

Figure 8:
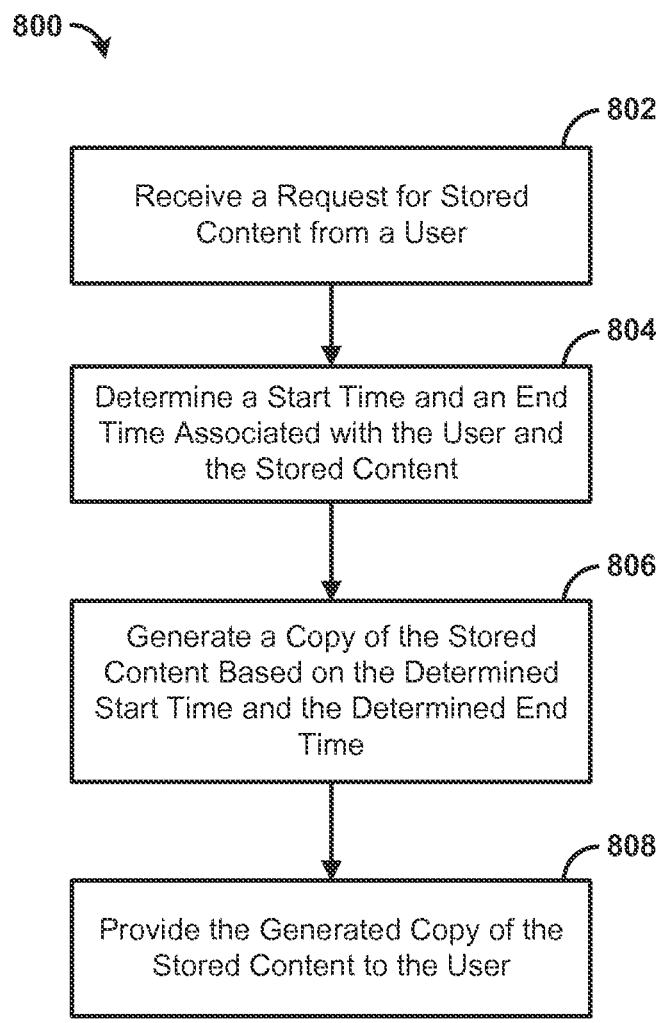
FIG. 8 is a flow chart of an exemplary method.

FIG. 8 is a flowchart illustrating an example method 800. At step 802, a request for stored content can be received from a user. In an aspect, the content can be a live program, such as a concert or sporting event. In an aspect, the content can be any video, such as a movie, show, or the like. At step 804, a start time and an end time can be determined to be associated with the user and the stored content. In an aspect, the determined start time for the content and the user can be based on a request for storage of the content originated by the user. In an aspect, the determined start time for the content can be stored in a database mapping the determined start time with the user. In an aspect, the determined end time for the content and the user can be based on a request for storage of the content originated by the user. In an aspect, the determined end time for the content can be stored in a database mapping the determined end time with the user.

At step 806, a copy of the stored content can be generated based on the determined start time and the determined end time. At step 808, the generated copy of the stored content can be provided to the user. In an aspect, the generated copy of the stored content can be packaged (e.g., cropped) so that the copy of the stored content begins at the determined start time and ends at the determined end time. In an aspect, the generated copy of the stored content can comprise metadata. In an aspect, the metadata can cause the generated copy of the stored content to begin playback at the determined start time. In an aspect, the metadata can cause the generated copy of the stored content to end playback at the determined end time. See the description for FIG. 2 above for more details on preparing and delivering content for play requests.

Figure 9:
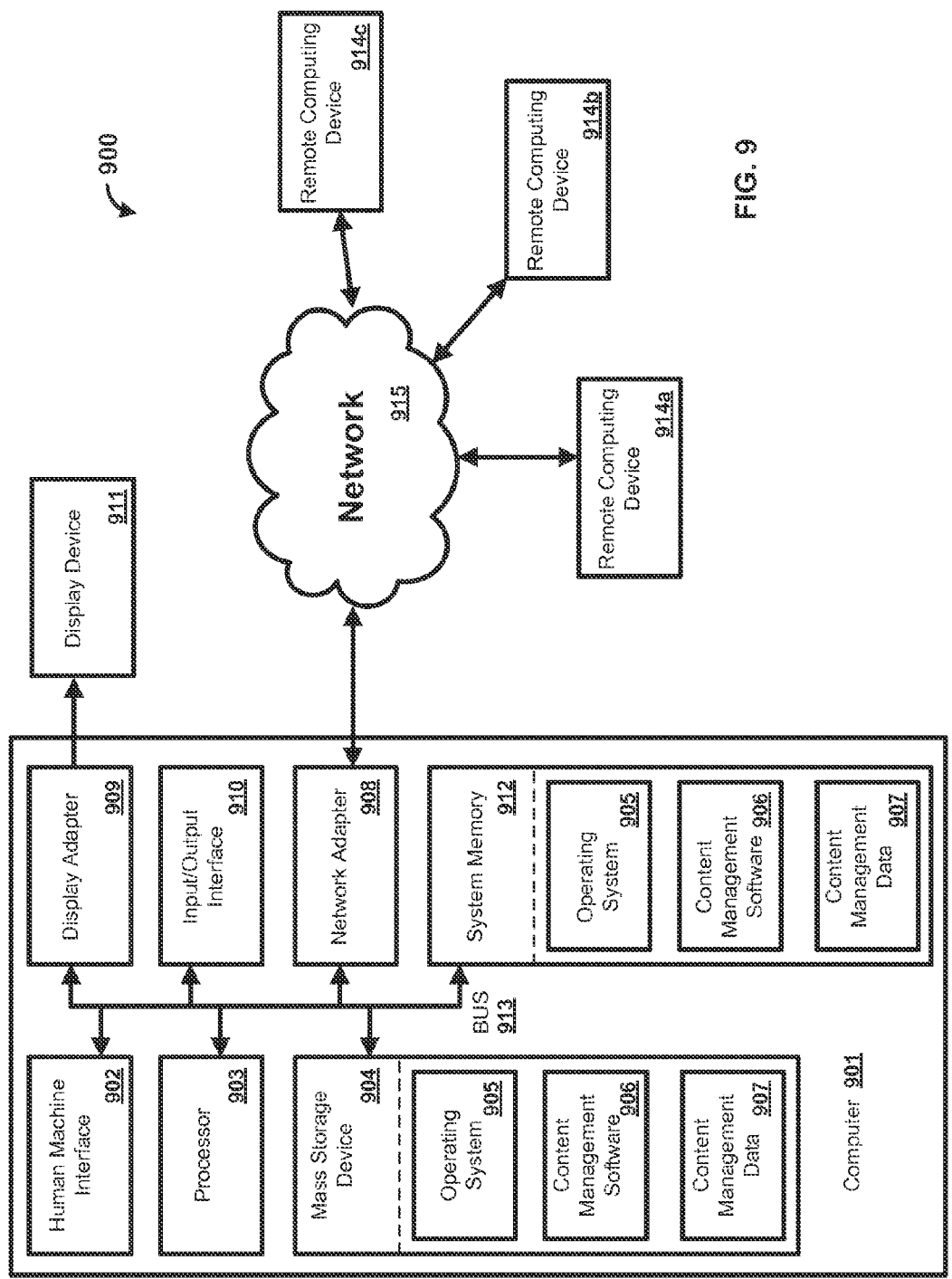
FIG. 9 is a block diagram of an exemplary computing device.

In an exemplary aspect, the methods and systems can be implemented on a computer 901 as illustrated in FIG. 9 and described below. By way of example, server 110 of FIG. 1 can be a computer 901 as illustrated in FIG. 9. Similarly, the methods and systems disclosed can utilize one or more computers to perform one or more functions in one or more locations. FIG. 9 is a block diagram illustrating an exemplary operating environment 900 for performing the disclosed methods. This exemplary operating environment 900 is only an example of an operating environment and is not intended to suggest any limitation as to the scope of use or functionality of operating environment architecture. Neither should the operating environment 900 be interpreted as having any dependency or requirement relating to any one or combination of components illustrated in the exemplary operating environment 900.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 901. The computer 901 can comprise one or more components, such as one or more processors 903, a system memory 912, and a bus 913 that couples various components of the computer 901 including the one or more processors 903 to the system memory 912. In the case of multiple processors 903, the system can utilize parallel computing.

The bus 913 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and one or more of the components of the computer 901, such as the one or more processors 903, a mass storage device 904, an operating system 905, content management software 906, content management data 907, a network adapter 908, system memory 912, an Input/Output Interface 910, a display adapter 909, a display device 911, and a human machine interface 902, can be contained within one or more remote computing devices 914*a,b,c* at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 can comprise computer readable media in the form of volatile memory, such as random access memory (RAM), and/or non-volatile memory, such as read only memory (ROM). The system memory 912 typically can comprise data such as content management data 907 and/or program modules such as operating system 905 and content management software 906 that are accessible to and/or are operated on by the one or more processors 903.

In another aspect, the computer 901 can also comprise other removable/non-removable, volatile/non-volatile computer storage media. The mass storage device 904 can provide non-volatile storage of computer code, computer readable instructions, data structures, program modules, and other data for the computer 901. For example, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and content management software 906. One or more of the operating system 905 and content management software 906 (or some combination thereof) can comprise elements of the programming and the content management software 906. Content management data 907 can also be stored on the mass storage device 904. Content management data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 915.

In another aspect, the user can enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 903 via a human machine interface 902 that is coupled to the bus 913, but can be connected by other interface and bus structures, such as a parallel port, game port, an IEEE 1394 Port (also known as a Firewire port), a serial port, network adapter 908, and/or a universal serial bus (USB).

In yet another aspect, a display device 911 can also be connected to the bus 913 via an interface, such as a display adapter 909. It is contemplated that the computer 901 can have more than one display adapter 909 and the computer 901 can have more than one display device 911. For example, a display device 911 can be a monitor, an LCD (Liquid Crystal Display), light emitting diode (LED) display, television, smart lens, smart glass, and; or a projector. In addition to the display device 911, other output peripheral devices can comprise components such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a,b,c. By way of example, a remote computing device 914a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components can reside at various times in different storage components of the computing device 901, and are executed by the one or more processors 903 of the computer 901. An implementation of content management software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:
1. A method comprising:
    providing a plurality of start offset options associated with a content item;
    receiving a plurality of requests to store the content item, wherein the plurality of requests comprises a plurality of start times associated with one or more of the plurality of start offset options and further comprises a plurality of end times associated with the content item;
    determining an earliest start time of the plurality of start times;
    determining a latest end time of the plurality of end times;

storing, for each of the plurality of requests, an instance of the content item starting at the determined earliest start time and ending at the determined latest end time;

receiving a play request for the content item comprising a start time later than the determined earliest start time and an end time earlier than the determined latest end time; and in response to the play request, providing the content item, wherein a portion of the content item earlier than the requested start time is not provided, and wherein a portion of the content item later than the requested end time is not provided.

2. The method of claim 1, further comprising deleting all instances of the content item except the stored instance of the content item.

3. The method of claim 1, wherein the plurality of start offset options comprise a plurality of times occurring before a start time associated with the content item and a plurality of times occurring after the start time associated with the content item.

4. The method of claim 1, wherein the content item is a live program.

5. The method of claim 1, wherein each of the plurality of start offset options is an offset of time before the content item is scheduled to start.

6. The method of claim 1, wherein each of the plurality of end times is one of a plurality of options that a user selects from a list, wherein each option of the plurality of options is an offset of time after the content item is scheduled to end.

7. The method of claim 1, wherein the plurality of requests to store the content item comprise a plurality of requests to store the content item at one or more of the following intervals: daily or weekly.

8. The method of claim 1, further comprising cropping each instance of the stored content item, wherein each instance represents an instance of a program, wherein each cropped instance begins at the start of the program, and wherein each cropped instance ends at the end of the program.

9. A method comprising:

providing a plurality of start offset options associated with a content item;

receiving a first request to store an instance of the content item, wherein the first request comprises a first start offset associated with the plurality of start offset options and a first end offset;

storing a first version of the content item in a first content file, wherein the first content file represents a portion of the content item occurring between and including the first start offset and the first end offset;

receiving a second request to store another instance of the content item, wherein the second request comprises a second start offset and a second end offset, wherein the second start offset is less than the first start offset, wherein the second end offset is less than the first end offset;

determining that the first version of the content item has already been stored;

determining that the second start offset is less than the first start offset and that the second end offset is less than the first end offset;

storing a second version of the content item in a second content file, wherein the second content file represents a portion of the content item occurring between and including the second start offset and the second end offset;

receiving a request for the content item, wherein the request comprises a start offset greater than the first start offset and an end offset greater than the first end offset; and in response to the request for the content item, transmitting the first content file, wherein a portion of the content item between the requested start offset and the first start offset is not transmitted, and wherein a portion of the content item between the requested end offset and the first end offset is not transmitted.

10. The method of claim 9, wherein one or more of the first start offset, the first end offset, the second start offset, or the second end offset are determined by one or more users.

11. The method of claim 9, wherein the network device is a cloud digital video recorder.

12. The method of claim 9, wherein determining that the first version of the content item has already been stored comprises matching an identifier associated with the content item.

13. The method of claim 9, further comprising deleting the second content file.

14. The method of claim 13, further comprising moving the first content file to an archival storage.

15. The method of claim 9, wherein the content item is a live program.

16. The method of claim 9, further comprising cropping the first version of the content item in the first content file, wherein the cropped first version of the content item is associated with a program, wherein the cropped first version of the content item begins at a start of the program, and wherein the cropped first version of the content item ends at an end of the program.

17. The method of claim 9, further comprising cropping the second version of the content item in the second content file, wherein the cropped second version of the content item is associated with a program, wherein the cropped second version of the content item begins at a start of the program, and wherein the cropped second version of the content item ends at an end of the program.

18. A method comprising:

providing, by a network device, a plurality of start offset options associated with a stored content item;

receiving a request for the stored content item, wherein the request comprises a first start time associated with the plurality of start offset options and a first end time;

determining, based on the request, a second start time that is offset to a time after the first start time and a second end time that is offset to a time before the first end time;

generating a copy of the stored content item that comprises the second start time and the second end time; and providing the generated copy of the stored content item, wherein a portion of the content item earlier than the second start time is not provided, and wherein a portion of the content item later than the second end time is not provided.

19. The method of claim 18, wherein generating the copy of the stored content item comprises cropping the copy of the stored content item so that the copy of the stored content item begins at the second start time and ends at the second end time, wherein a portion of the stored content item occurring before the second start time comprises one or more of credits associated with the stored content item, an introduction associated with the stored content item, or a pregame, and wherein a portion of the stored content item occurring after the second end time comprises one or more of credits associated with the stored content item, commentary associated with the stored content item, or a postgame.

20. The method of claim 18, wherein providing the generated copy of the stored content item comprises providing metadata, wherein the metadata causes the generated copy of the stored content item to begin playback at the second start time and end playback at the second end time.

\* \* \* \* \*